United States Patent [19]

Siemers et al.

[11] Patent Number: 5,058,411
[45] Date of Patent: Oct. 22, 1991

[54] METHOD FOR SHAPING FILAMENT REINFORCED ANNULAR OBJECTS

[75] Inventors: Paul A. Siemers; Stephen F. Rutkowski, both of New York, N.Y.

[73] Assignee: General Electric Company, Schenectady, N.Y.

[21] Appl. No.: 493,651

[22] Filed: Mar. 15, 1990

[51] Int. Cl.⁵ .............................................. B21D 37/16
[52] U.S. Cl. .................................. 72/342.4; 72/342.5; 72/342.7
[58] Field of Search ................... 72/342.4, 364, 842.1, 72/342.5, 342.7; 29/423, 447

[56] References Cited

U.S. PATENT DOCUMENTS

| | | | |
|---|---|---|---|
| 1,409,562 | 3/1922 | Mason | 29/423 |
| 3,060,564 | 10/1962 | Corral | 72/342.1 |
| 3,298,096 | 1/1967 | Stuart | 72/364 |
| 3,315,513 | 4/1967 | Ellenburg | 72/342.4 |
| 3,383,900 | 5/1968 | Hartesveldt | 72/364 |
| 3,552,178 | 1/1971 | Felgar, Jr. | 72/342.4 |
| 3,728,886 | 4/1973 | Wightman | 72/364 |
| 3,834,013 | 9/1974 | Gerstle | 72/364 |
| 3,986,654 | 10/1976 | Hart et al. | 72/342.7 |
| 4,989,433 | 2/1991 | Harmon et al. | 72/342.4 |

FOREIGN PATENT DOCUMENTS 120426  9/1980  Japan .................................. 72/364

*Primary Examiner*—Robert L. Spruill
*Attorney, Agent, or Firm*—Paul E. Rochford; James C. Davis, Jr.; James Magee, Jr.

[57] ABSTRACT

A method for controlling the dimension of a reinforced metal matrix composite structure is taught. The structure is annular and the method is to render the structure non-round where the initial structure is essentially round. The cure of the essentially round condition is accomplished by forming a solid mandril very slightly smaller in dimensions than the final dimensions sought for the structure. The essentially round composite ring is forced onto the non-round mandril and heated to the relaxation temperature of the matrix. Because the mandril has a higher thermal coefficient of expansion than the matrix, the method is effective in forming an essentially round structure into a non-round configuration.

1 Claim, 1 Drawing Sheet

METHOD FOR SHAPING FILAMENT REINFORCED ANNULAR OBJECTS

CROSS REFERENCES OF RELATED APPLICATIONS

The subject application is closely related to copending commonly owned application Ser. No. 07/498,794, filed Mar. 26, 1990. The copending application is incorporated herein by reference.

BACKGROUND OF THE INVENTION

The present invention relates generally to annular structures formed with metal matrix and with a filament reinforcement. More particularly it relates to annular structures having a titanium base matrix and reinforced by filaments of silicon carbide and to the shaping of such structures to a true round internal shape within very small limitations.

The preparation of titanium alloy base foils, sheets, and similar articles and of reinforced structures in which silicon carbide fibers are embedded in a titanium base alloy are described in U.S. Pat. Nos. 4,775,547; 4,782,884; 4,786,566; 4,805,294; 4,805,833; and 4,838,337 assigned to the same assignee as the subject application. The texts of these patents are incorporated herein by reference. Preparation of composites as described in these patents is the subject of intense study inasmuch as the composites have very high strength properties in relation to their weight. One of the properties which is particularly desirable is the high tensile properties imparted to the structures by the high tensile properties of the silicon carbide fibers or filaments. The tensile properties of the structures are related to the rule of mixtures. According to this rule the proportion of the property, such as tensile property, which is attributed to the filament, as contrasted with the matrix, is determined by the volume percent of the filament present in the structure and by the tensile strength of the filament itself. Similarly, the proportion of the same tensile property which is attributed to the matrix is determined by the volume percent of the matrix present in the structure and the tensile strength of the matrix itself.

Prior to the development of the processes described in the above-referenced patents, such structures were prepared by sandwiching the reinforcing filaments between foils of titanium base alloy and pressing the stacks of alternate layers of alloy and reinforcing filament until a composite structure was formed. However, that prior art practice was found to be less than satisfactory when attempts were made to form ring structures in which the filament was an internal reinforcement for the entire ring.

The structures taught in the above-referenced patents and the methods by which they are formed, greatly improved over the earlier practice of forming sandwiches of matrix and reinforcing filament by compression.

Later it was found that while the structures prepared as described in the above-referenced patents have properties which are a great improvement over earlier structures, the attainment of the potentially very high ultimate tensile strength of these structures did not measure up to the values theoretically possible. The testing of composites formed according to the methods taught in the above patents has demonstrated that although modulus value are generally in good agreement with the rule of mixtures predictions, the ultimate tensile strength is usually much lower than predicted by the underlying properties of the individual ingredients to the composite. A number of applications have been filed which are directed toward overcoming the problem of lower than expected tensile properties and a number of these applications are copending. These include commonly owned applications Ser. No. 445,203, filed Dec. 4, 1989; Ser. No. 459,894, filed Jan. 2, 1990, now U.S. Pat. No. 4,978,585; Ser. No. 455,041, filed Dec. 22, 1989, now U.S. Pat. No. 5,017,438; and Ser. No. 455,048, filed Dec. 22, 1989. The texts of these applications are incorporated herein by reference.

One of the structures which has been found to be particularly desirable in the use of the technology of these reference patents is an annular article having a metal matrix and having silicon carbide filament reinforcement extending many times around the entire ring. Such ring structures have very high tensile properties relative to their weight particularly when compared to structures made entirely of metal. These structures are usually up to several feet in diameter.

It has been found difficult particularly because of the very high temperatures which must be used in forming such articles to produce a ring structure which is true round in its internal dimensions. Such structures must be true round in their internal dimensions in order for the structures to be used most effectively in end use applications inasmuch as the structures are often used as part of a more complex structure and for this purpose are fitted over one or a number of elements in a circular form in order to serve as a reinforcing ring.

The reinforced ring can be used, for example, as part of a metal matrix composite compressor disk of a jet engine. In order to reinforce the disk in a compressor stage of a jet engine a large number of layers of reinforcing filaments are required. It has been found that it is very difficult to continue to add more and more layers of filament reinforcement to a ring structure because shrinkage of the ring diameter during HIP densification can result. One way in which this problem has been solved is by forming a series of concentric rings which are then assembled together to provide a reinforced ring structure having more than 100 layers of reinforcement. Such ring structures are of quite large diameter of the order of a foot or several feet and must nevertheless be nested together within very close tolerances of only a few thousands of an inch. Obviously when such structures are out of round it is very difficult to accomplish such an assembly of several concentric rings into a single assembled ring structure.

BRIEF STATEMENT OF THE INVENTION

It is, accordingly, one object of the present invention to provide a method by which an out-of-round fiber reinforced ring having a metal matrix may be brought into true round.

Another object is to provide a method of forming a reinforced matrix ring structure having internal dimensions which are at or very close to true round.

Another object is to provide a silicon carbide reinforced titanium ring having internal dimensions which are true round.

Another object is to provide a method of forming a reinforced matrix ring structure having internal configuration conforming to a non-round cylindrical shape.

Other objects will be in part apparent and in part pointed out in the description which follows.

In one of its broader aspects, objects of the present invention can be achieved by providing a filament reenforced metal matrix ring structure which is slightly out-of-round. The structure is fitted over a true round cylinder of a metal having a greater thermal coefficient of expansion than that of the reinforced ring. The cylinder is formed to have a diameter slightly smaller than that of the ring interior and the cylinder is forced into the ring without altering the external true round configuration of the cylinder. The ring and the contained cylinder are heated to a temperature at which the diameter of the inner cylinder is the same or larger than that of the internal diameter of the ring and which is also above the stress relaxation temperature of the matrix of the ring. After holding the ring and cylinder at the temperature for a period of time of less than an hour, the ring and cylinder are cooled. Following the cooling, the cylinder is removed from the ring.

BRIEF DESCRIPTION OF THE DRAWINGS

The description which follows will be understood with greater clarity if reference is made to the accompanying drawings in which.

DETAILED DESCRIPTION OF THE INVENTION

Figure 1:
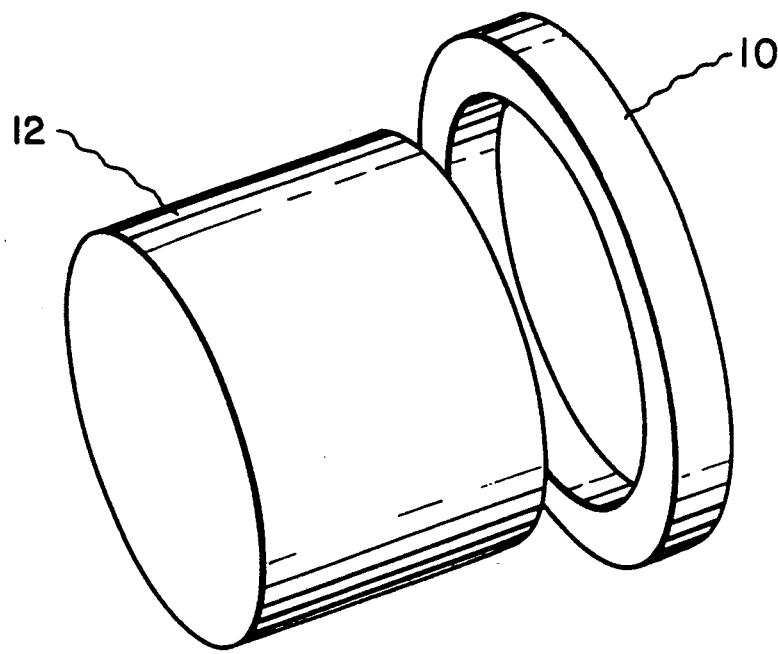
FIG. 1 is a side elevation of a cylinder and ring prior to assembly.

A low pressure r.f. plasma-spray process is used for the fabrication of multi-layer titanium base alloy ring elements where the titanium base alloy serves as a matrix in a composite structure containing reinforcing filaments. The silicon carbide filaments are the principal filaments of concern for these reinforced composite structures. The titanium base alloy can be a conventional titanium such as Ti-6Al-4V (Ti-64); Ti-6Al-2Sn-4Zr-2Mo (Ti-6242); Ti-14Al-21Nb; (Ti1421); these compositions being by weight; or it can be a titanium aluminide. Such aluminide may be a gamma aluminide containing 48 atomic % titanium, 48 atomic % aluminum, 2 atomic % of niobium and 2 atomic % of chromium for example.

The composite ring elements are fabricated by plasma-spraying of a ⅛ inch thick layer of the matrix alloy onto a cylinder of mild steel. The steel mandril is removed from the matrix alloy layer by chemical dissolution in a nitric acid solution or by thermal debonding using the thermal expansion difference between the titanium alloy matrix and the mild steel. The "as-sprayed" titanium alloy matrix ring is then wound with continuous SiC filament in a subsequent winding operation as described in the patents referenced in the background statement. The filament wound cylinder is then over-sprayed with additional titanium base matrix alloy to completely cover the filament. The winding and spraying steps are repeated until the desired number of plies is obtained on the composite ring element.

To improve filament spacing and alignment and interlayer bonding the as-sprayed layer may be machined or otherwise rendered smooth.

Since the low pressure RF plasma-spray process yields an as-sprayed density less than theoretical it is necessary to HIP densify the composite ring. The term HIP signifies heating and isostatic pressing which is a well-known conventional processing step. The dimensional change of the ring during HIPing can lead to fiber buckling in the outermost layers of the composite ring. Consequently, there is a practical limit of 20 to 30 added layers, which can be deposited at one time before it becomes necessary to densify the ring. Such densification of a structure having 20 or 30 layers seeks to avoid the buckling and damage to the rings which is occasioned by the HIPing of a composite structure having more than 30 layers to be densified at one time.

The composite structure to be formed is one having as many as 150 layers or more. A structure with about 150 layers of composite is a novel structure which is deemed suitable for use, for example, as reinforcing rings in aircraft engine compressor structures. One way of achieving this number of layers is by "nesting" multiple composite ring elements which are separately fabricated. Following the separate fabrication and separate HIP densification, such composite ring elements are "nested" together to form a ring assembly which can be HIP bonded to form a composite ring with the desired number of plies.

Regarding the individual ring elements which are assembled into the nested composite, an individual ring element of about 20 layers will be exposed to 22 to 23 thermal cycles associated with the RF plasma-spray process. As a consequence the ring element may distort 0.020 to 0.040 inches of out-of-round. However, the component structures which are out-of-round to this degree cannot be assembled by nesting into a single composite which can be HIP bonded to form a single composite ring with the desired number of plies. In fact to diffusion bond nested ring elements it is required that the outside diameter of the inner ring be about 0.003 to 0.005 inches smaller than the inside diameter of the outer ring. These close tolerances on parts that may be several feet in diameter are nearly impossible to achieve if the original parts are out-of-round. A need exists for a method which permits composite rings to be formed originally with the desired and needed roundness or to restore the roundness of the metal matrix composite rings prior to machining them to the high tolerances required for nesting. By the term "true-round" as use herein is meant that the ring is round to tolerances of 0.000 or for practical purposes are round to values of 0.003 inches or less.

Figure 2:
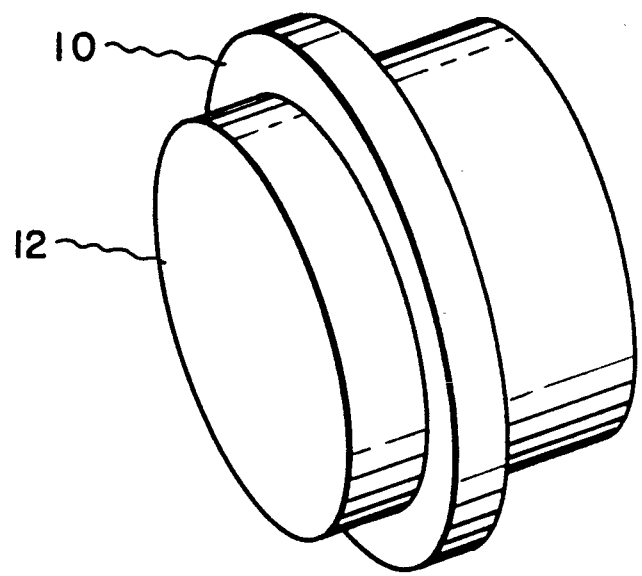
FIG. 2 is a side elevation similar to that of FIG. 1 but showing the cylinder and ring after assembly.

We have discovered that a composite ring such as 10 of FIG. 1 which is more than 0.175 inches out-of-round can be made round to within 0.003 inches using a simple thermal treatment in the presence of a solid round mandril such as 12 of FIG. 1 having a thermal expansion coefficient larger than that of the composite. We have discovered that during heat treatment above the stress relaxation temperature of the matrix alloy the high expansion coefficient mandril expands at a greater rate than the composite and thus causes a pushing action against the inside diameter of the composite. The composite inside diameter is thereby held round while the internal stresses of the composite matrix alloy are relaxed at the elevated temperature. This is accomplished in the manner illustrated in FIG. 2.

One factor on which the success of our method depends is that the stress relaxation temperature of the filamentary reinforcements used in metal matrix composites is considerably higher than that of the matrix alloy. As a consequence it is believed that the composite internal stresses can be modified using the treatment which we have developed. We believe that the relatively large tensile stresses in the matrix alloy and the compressive stresses in the filament resulting from the thermal expansion difference between the matrix and the reinforcement can be reduced if the filaments are maintained in a state of tension while the composite is maintained at or above the matrix stress relaxation temperature. During cooling from the heat treatment temperature the fiber stress would gradually change from tensile to compressive depending on the relative stress, temperature, and thermal expansion behavior of the matrix and fibers.

Furthermore we believe that the maintenance of the fibers in a state of tension, and the matrix in the state of compression, results in improved composite properties particularly when a brittle matrix alloy is used. A compressive stress in the matrix is believed to increase the strain to failure of the matrix and composite. The thermal treatment described herein is believed to generate the desired stress state in the composite.

The following example is given to illustrate how the method of the present invention can be carried into effect and to illustrate the types of structures which are formed thereby.

EXAMPLE 1

A 4 inch diameter 4 inch wide composite ring was fabricated using a Ti-1421 alloy as the matrix alloy. Ti-1421 is an alloy containing 14 weight % aluminum 21 weight % niobium and the remainder titanium. The reinforcement for the titanium base matrix was silicon carbide filaments. These filaments were obtained from Textron Corporation and are identified as SCS-6 filaments. A ⅛ inch thick layer of the matrix alloy was plasma-sprayed onto a cylinder of mild steel. The "as-sprayed" titanium alloy matrix ring was then machined smooth. The smooth matrix ring was then grooved with a continuous helical thread about 0.003 inches deep to allow precise placement of the SiC filament in a subsequent winding operation. A continuous SiC filament was wound into the helical grooves and anchored at each end. The filament wound cylinder was then over-sprayed with additional Ti-1421 alloy and the alloy and the plasma-sprayed alloy deposit was machined to a smooth surface. Again the smooth surface was grooved with a continuous helical thread about 0.003 inches deep to again allow the precise placement of continuous SiC filament. The SiC filament was wound into the grooves and was anchored again at each end. An overspray of Ti-1421 was again applied.

These operations were repeated until a desired number of layers of reinforcing filament were incorporated into the deposited matrix metal. During the fabrication of the second ply the ring was accidently overheated and experienced considerable distortion and melting where it contacted the steel mandril. After the second ply had been fabricated, the 4 inch wide composite ring was cut to separate several ¾ inch wide composite rings from the damaged composite. The cut rings were measured and were found to be about 0.175 inches out-of-round.

A solid 304L stainless steel cylinder was machined to have an outside diameter about 0.040 inches smaller than the average diameter of one of the cut rings. The cut ring was forced over the stainless steel mandril. The mandril and composite cut ring were heated to 900° C. in a vacuum furnace and maintained at the 900° C. temperature for about fifteen minutes. After fifteen minutes of heating in this fashion the assembly was argon quenched and cooled to room temperature. The ring was again measured and was this time found to be round to within 0.003 inches. Thus the out-of-round ring was brought into true round by this procedure.

The composite matrix alloy was dissolved in a nitric-hydrofluoric-water solution leaving only the SiC filaments. The filaments were found to be unbroken. Apparently the thermal treatment did not break any of the fibers.

EXAMPLE 2

A second ring cut from the specimen as described in EXAMPLE 1 was given the same thermal treatment previously described. The thermal treatment restored the roundness of the ring to within 0.003 inches thus giving the same result as was found in EXAMPLE 1.

Filament reinforcements other than the SiC filaments may be used in the practice of the present invention. For example, ceramic reinforcing filaments such as of single crystal $Al_2O_3$ may be employed.

It will be appreciated from the foregoing that, in addition to rendering a ring structure which is initially out of round into a true round shape, it is also possible to render a ring structure into a non-round shape by forcing the ring structure over a mandrel which is in a non-round shape such as an oval or ellipse or similar out-of-round shape.

What is claimed is:

1. A method for rendering the internal shape of a filament reinforced metal matrix ring structure non-round which comprises,
   providing a ceramic filament reinforced metal matrix ring structure which is essentially round,
   preparing a cylinder of a metal having a greater thermal coefficient of expansion than that of the ring in a selected non-round configuration,
   said cylinder having a diameter slightly smaller than that of the ring interior,
   forcing the non-round cylinder into the ring,
   heating the ring and contained cylinder to a temperature which makes its diameter larger than the internal diameter of the ring,
   cooling the ring and cylinder, and
   removing the cylinder from the ring.

* * * * *